ARTHUR R. GOLDSBY
CLAUDE W. WATSON
INVENTORS

THEIR ATTORNEY

Patented Nov. 30, 1948

2,454,869

UNITED STATES PATENT OFFICE 2,454,869

ALKYLATION METHOD

Arthur R. Goldsby, Beacon, and Claude W. Watson, Tuckahoe, N. Y., assignors to The Texas Company, New York, N. Y., a corporation of Delaware Application February 24, 1943, Serial No. 476,896

3 Claims. (Cl. 260—683.4)

This invention relates to the catalytic alkylation of a hydrocarbon or other organic compound having a replaceable hydrogen atom with a suitable alkylating agent, such as an olefin, for the production of gasoline hydrocarbons of high antiknock value suitable for aviation gasoline and motor fuel, or for the production of valuable alkylated organic compounds for other purposes.

One of the principal objects of the invention is to provide an improved method of alkylating such an organic compound having a replaceable hydrogen atom with an alkylating agent to avoid local accumulation of alkylating agent, such as an olefin, in any portion of the reaction zone to thereby avoid objectionable side reactions of the alkylating agent in the presence of the catalyst, whereby high yields of a superior quality of alkylate are obtained while effecting economy in installation and operating expense.

A further object of the invention is to provide a novel catalytic alkylation method of this character to obtain improved quality and yield of alkylate and increased catalyst life for a given set of operating conditions, or to obtain increased capacity without sacrifice of quality and yield of alkylate or reduction in catalyst life, from a given unit under different and more economical operating conditions.

Another object of the invention is to provide an improved method of alkylating an isoparaffin with a suitable alkylating agent, such as an olefin, wherein the alkylating agent is introduced into a mechanically-agitated body or stream of the hydrocarbons and catalyst at a large number of spaced points, and in fine subdivision or small droplets from each of the points, whereby the alkylating agent is promptly reacted without polymerization or other objectionable side reactions, and good catalyst life and high quality alkylate are secured without the necessity of maintaining the very high isoparaffin concentration in the reacted mix previously thought necessary to attain these results.

Still another object of the invention is to provide novel apparatus for carrying out the above methods.

Other objects and advantages of the invention will be apparent from the following description when taken in conjunction with the accompanying drawing and appended claims.

Various catalytic alkylation processes for alkylating an isoparaffin with an olefin or other suitable alkylating agent for the production of gasoline hydrocarbons of high anti-knock value are known. These involve the use of catalysts such as strong sulfuric acid, hydrofluoric acid, aluminum chloride, $BF_3$-water complex, etc. The best known process which is now widely used on a commercial scale is the sulfuric acid alkylation process. Various reactors, such as the pump and time tank reactor, jet type reactor, and propeller type of mixer such as the "Stratco" reactor, have been used in this process. In these various processes, it is an objective to preferentially react the olefin with the isoparaffin to produce the desired alkylate and minimize side reactions of the olefin with itself or with the catalyst, which side reactions cause deterioration in quality and yield of the product and reduce catalyst life.

In order to accomplish this objective, it is customary to use a feed in which the isoparaffin is in substantial molar excess of the olefin, and also to recycle hydrocarbon products or an emulsion of catalyst with hydrocarbon products in order to build up a very high ratio of isoparaffin to olefin at the point of contact of the olefin with the alkylation catalyst. Moreover, it is approved practice to carefully fractionate and precondition the feed to remove normal paraffin diluents and impurities, and to maintain a very high isoparaffin concentration in the hydrocarbon phase of the reacted mix, such as an isobutane concentration of 60–70% or more by volume in the hydrocarbon phase undergoing reaction, where alkylate of the highest clear octane is desired.

It has also been customary to employ two or more reactor systems in series, with the olefin feed split between the plurality of reactors. In all the systems heretofore suggested or employed, the olefin feed has been introduced at one point or localized area, or at two or three points at most of any reactor system. While very good operation has been secured in the past with the expedients mentioned above, including high isoparaffin-to-olefin feed ratio, high emulsion recycle ratio, split olefin feed, and high isoparaffin concentration in the hydrocarbon phase of the reacted mix, there are still some side reactions which show up largely in reduction in yield and quality of the alkylate and in catalyst deterioration, thereby reducing the life of the catalyst and increasing the cost of the process per unit volume of alkylate and finished 100 octane gasoline produced. Further, the necessity for maintaining the very high isobutane concentration in the reacted mix represents one of the most expensive items of the process, due to the expense involved in the installation and operation of the fractionating equipment required for separating isobutane of the purity desired for recycling to the reaction zone.

In accordance with the present invention, the olefin or other alkylating agent is introduced into the recirculating stream in finely-divided form and at a large number of spaced points extending throughout a substantial portion of the volume of the mechanically-agitated mix or the length of the recirculating stream. While in the so-called jet type of reactor, it has been previously proposed to inject the olefin into the reactor in finely-divided form through an aluminum or other porous member having openings of substantially capillary size, these openings have been concentrated in one local area of the reactor. Consequently, even though the olefin was introduced in small streams, the various streams were concentrated in a small portion of the volume of the reaction mass. Moreover, in this type of reactor, there was no mechanically-maintained agitation and circulation as herein defined, since the force of injection through the jet was relied on to churn up the contents of the reactor and produce a turbulent mixing action without directional flow characteristics. The present invention is distinguished by the use of mechanically-maintained agitation and circulation independent of the olefin feed orifices or openings, and by the spacing of the small olefin feed openings throughout a substantial extent of the reaction zone so that local accumulation of olefin is avoided. By the expression "mechanically-maintained agitation" as used herein throughout the description and claims, it will be understood some form of power-driven agitator, pump, turbine or propeller for imparting vigorous agitation and circulation to the contents of the reactor independently of the olefin feed is intended.

While in the pump and time tank reactor, there is positively-directed flow in an external recirculating stream, by a pump which is independent of the olefin feed, the latter is invariably introduced into this recirculating stream at one or at most two or three points from a relatively large pipe or pipes. The same is true of the propeller mixer such as the "Stratco" reactor, wherein the olefin feed is introduced into the internal recirculating stream at a single point. In an effort to overcome the objectionable side reactions in such equipment, it is customary to circulate the emulsion stream at high velocity past the point of introduction of the olefin stream. However, this does not wholly accomplish the desired objective, apparently due to the fact that the olefin is introduced in a relatively large stream from the large pipe opening, thereby resulting in local accumulation.

The present invention is distinguished from this practice by the use of a very large number of small openings spaced throughout a substantial portion of the length of the recirculating stream, whereby such local accumulation cannot occur. For example, the openings may each be less than one-quarter inch in diameter and smaller down to capillary size; and there may be as many as from fifty up to several thousand or more openings for the same overall olefin feed rate distributed with fairly equal spacing throughout one-quarter to one-half or more of the length of the recirculating passage in the reaction zone. Moreover, the spacing of the various points of introduction is correlated with the velocity of flow and volume of the recirculating stream, whereby olefin introduced into an increment of the recirculating stream at one point per unit of time is substantially completely reacted by the time said increment receives the next portion of olefin feed. This does not imply that the olefin has reacted by the time said increment moves forward to the next opening in series, since the openings are also spaced laterally or circumferentially of the circulating stream so that different increments of the circulating stream receive olefin from adjacently-positioned openings in the direction of flow. By the expression "reacted" as used immediately above, it is to be understood that this does not necessarily mean that the alkylation reaction with the isoparaffin of that olefin has been completed but it does imply that the olefin or other alkylating agent has been removed as a factor causing local overheating and objectionable side reactions which impair the quality of the product as determined by the percentage boiling above the theoretically-predicted product, such as octanes for isobutane-butylene alkylation, heptanes for isobutane-propylene alkylation, etc., and which cause catalyst deterioration as determined by catalyst life.

The present invention effectively inhibits and limits the localized concentration and building-up of alkyl sulfate in the sulfuric acid catalyst. Where the olefin is introduced in very small size, such as from openings approaching capillary size, some overlapping of olefin from adjacent openings is permissible, since the olefin will not accumulate to any greater extent than the initial accumulation resulting from introduction from a larger size orifice of about one-eighth to one-quarter inch diameter. Apparently, the first fraction of a second of contact of the olefin with the acid is the critical time. When the olefin is properly introduced, and the concentration of the olefin or its reaction product with the acid is maintained at a very low figure, the olefin may remain in the acid with safety and without adverse results for relatively long periods. The overall or average concentration of the olefin or alkyl sulfate in the acid and which can be measured will, of course, always be much less than the concentration immediately at the point of olefin entry. But when operating by the process of this invention, the concentration at the immediate point of entry is very greatly reduced; and this reduction may be considerably greater than the reduction in the overall or average concentration which can be measured. In other words, this invention departs from prior practice in this art in that it is primarily concerned with greatly reducing the concentration of olefin at the immediate point of entry and in any portion of the reacting mix for the first fraction of a second to a few seconds following the introduction of the olefin. In considering the concentration of olefin in the acid, this invention is concerned with very small units of the acid immediately surrounding or contacting the introduced olefin droplets and not necessarily in the overall reaction mixture which is susceptible to an average measurent of alkyl sulfate concentration. By combining the feature of finely subdividing the olefin with the finite spacing of the different and large number of points of olefin introduction so as to prevent any substantial accumulation or build-up of olefin in any increment of the acid in the reaction mixture, local overheating which is apparently conducive to objectionable side reactions is effectively avoided. This avoidance of the build-up and accumulation of alkyl ester concentration in the acid together with the avoidance of localized overheating and side reactions such as polymerization and hydropolymerization are apparently responsible for the improved catalyst life and other advantages attained by the process of the present invention.

It will be understood that the statements in the preceding paragraph apply to alkylating conditions including a high isoparaffin-to-olefin ratio and a proper proportion of isobutane in the hydrocarbon phase of the reacted mix. Moreover, in accordance with the present invention, not only is the olefin distributed throughout the reacting mix by multitudinous point injection, but also the feed isoparaffin, such as isobutane, or a substantial portion thereof may likewise be disseminated widely and more uniformly throughout the reacting mix and thus more homogeneously emulsified with and/or dissolved in the acid. This is accomplished by mixing all or a portion of the isobutane fresh feed and the external isobutane recycle with the olefin feed, and introducing the mixture into the reaction zone through the very large number of openings spaced widely throughout the said zone.

It has been postulated that the alkylation reaction takes place between isobutane dissolved in the acid and olefin at the acid hydrocarbon interface; and it is believed that the failure of prior alkylation equipment in preventing objectionable side reactions has been largely due to practical mechanical limitations on the efficiency of agitation and mixing or the velocity of emulsion recycle in getting isobutane dissolved uniformly throughout the acid and maintaining the required equilibrium between the isobutane in the acid phase and isobutane in the hydrocarbon phase. The present invention overcomes these mechanical difficulties by initially distributing the isobutane in finely-divided form throughout the acid in the reaction zone, rather than by adding the isobutane in one or a few large streams and then attempting to get uniform distribution solely by efficient mechanical mixing or high-speed recirculation with turbulent flow. The proper distribution of dissolved isobutane throughout the acid phase, and the proper equilibrium between the isobutane in the acid phase and the isobutane in the hydrocarbon phase is thereby accomplished in a practical and economical manner, with the further advantage that the power requirements for the mechanical agitation or the recirculation may be substantially reduced while still obtaining improved results.

Further, the ratio of isobutane to olefin at the point of olefin entry and contact with the acid, termed the "contact ratio," is at the same time increased far beyond anything heretofore secured or deemed practical. Thus, another object of the present invention in obtaining a very high effective contact ratio at the immediate points of olefin entry is accomplished at a much lower cost than for so-called contact ratios of about 500:1 to 1200:1 heretofore specified, which latter were previously considered to be about the highest practically attainable. In the present case, effective contact ratios of about 1500:1 to 2,000,000:1 and higher are readily secured. Since the first fraction of a second following initial contact of the olefin with the acid appears to be the critical time, and the olefin is then fixed or converted to an inactive form so far as objectionable side reactions are concerned, the expression "effective contact ratio at the immediate point of olefin entry" is used in the description and claims to signify the product obtained by isoparaffin-olefin feed ratio times the internal isoparaffin recycle (which is the isoparaffin or isobutane content of the recycled emulsion) to hydrocarbon feed ratio times the number of olefin feed openings in the reactor system (each opening being of sufficiently small size and the various openings spaced sufficiently far apart that each olefin droplet issuing from any opening may be considered as a unit for all practical purposes). For example, with a 3:1 isobutane-olefin feed ratio, a relatively low 10:1 internal isobutane recycle ratio, and 50 olefin entry points of small size distributed throughout the reaction zone in accordance with the present invention, the effective isobutane to olefin contact ratio at the immediate point of olefin entry is (3×10×50):1 or 1500:1. Likewise, with a 5:1 feed ratio, a 200:1 internal recycle ratio and 2000 olefin entry points, the effective contact ratio is 2,000,000:1. In this connection, it should be borne in mind that in previous alkylation units, such as the propeller mixer type, operating with high velocities of recirculating emulsion and which have been described as having contact ratios up to about 1200:1, the "effective contact ratio at the immediate point of olefin entry" is actually much lower than this, because the olefin is introduced in a relatively large stream and is therefore accumulated or concentrated at the immediate locus of the relatively large pipe opening where the olefin enters the circulating mix as a stream (as opposed to dispersed tiny droplets). Therefore, the quantity of olefin in this stream at said locus (which represents the first fraction of a second of contact with the acid) is as much as sixty-four or more times greater than the unitary size or quantity of the olefin droplet mentioned above, giving an effective contact ratio at the immediate point of olefin entry as above defined of less than 20:1.

By following the principles of the present invention, improved results in the form of increased yield of better quality alkylate and improved catalyst life can be secured from a given set of operating conditions. For example, in $C_4$ alkylation utilizing a high ratio of isobutane in the hydrocarbon phase in the reacted mix, such as an isobutane concentration of 60-70% by volume, further improvement in yield and quality of alkylate with the production of a 95-96 clear octane total alkylate, and a concomitant increase in acid life from 20 up to 50 or more gallons of alkylate per pound of acid consumed, may be realized. Also, the present invention enables the isobutane concentration in the reacted mix to be substantially lowered, such as to about 40-60% and preferably around 50%, and still secure yields and quality of alkylate and catalyst life comparable to those formerly obtained under only optimum conditions with the very high isobutane concentrations, with resultant increase in capacity and greatly improved economy in installation and operating expense.

Furthermore, due to the more positively-directed reaction of the isoparaffin with the olefin under the conditions set forth herein, the contact time for the reaction may be substantially reduced over that now employed, thereby resulting in greater capacity for the same size of unit. "Contact time" as employed herein means the hydrocarbon volume of the recirculating stream divided by the rate of fresh hydrocarbon feed, which latter includes the external isoparaffin recycle. In conventional sulfuric acid alkylation, it is customary to employ a contact time of about 20 minutes minimum, and generally about 30 minutes or more. In accordance with the present invention, the contact time may be reduced to about 10 minutes or even less. For example, with a high acid-to-hydrocarbon ratio in excess of about 1:1 by volume, such as about 1.3:1 to 2:1, and with accelerated settling as by the aid of a centrifuge, the contact time may be reduced to about 1-5 minutes. Moreover, power requirements may be reduced, since the need for extremely high velocities of flow of the recirculated stream is lessened. Thus, in a reactor of the propeller-mixer type normally operating to effect a complete turnover of the contents of the reactor once every thirty to forty seconds, for example, the rate of recirculation may be reduced in accordance with the present invention so as to secure a complete turnover in about seventy-five to a hundred seconds or more, while still obtaining improved results.

The present invention is applicable to the alkylation of any low-boiling isoparaffin with any normally gaseous or normally liquid olefin. Thus, the isoparaffin may be isobutane, isopentane or isohexane. The olefin may be ethylene, propylene, butylenes, pentylenes, hexylenes, other higher boiling monomeric olefins or certain selected fractions of cracked naphthas, olefin polymers such as di-isobutylene, tri-isobutylene, cross-polymers of isobutylene and normal butylenes, and various mixed or non-selective polymers. In place of olefins as the alkylating agent, various alkyl esters, such as the sulfates, chlorides, fluorides, etc., may be used. Moreover, various aliphatic alcohols and ethers, such as tertiary butyl alcohol, isopropyl alcohol, butyl ether, etc., may be employed as the alkylating agent, particularly with catalysts which have tolerance for water liberated in the reaction. The expression "alkylating agent" is used herein throughout the description and claims to denote any of the above compounds which react with an isoparaffin or other organic compound having a replaceable hydrogen atom in this alkylation reaction to produce alkylated hydrocarbons. In place of the pure hydrocarbons or other alkylating agents, it is of course to be understood that various refinery fractions, such as a $C_4$, $C_3$—$C_4$, $C_4$—$C_5$, $C_5$, etc. may be employed.

The present invention is applicable to the use of any of the well-known alkylation catalysts, such as sulfuric acid, hydrofluoric acid, aluminum chloride-hydrocarbon complex, $BF_3.nH_2O$, chlorsulfonic acid, fluorsulfonic acid and the like. The various conditions for the reactions employing these catalysts are well known; and conventional conditions coupled with the features of the present invention as set forth above may be used. By way of example, the invention is more particularly described herein in connection with the use of strong sulfuric acid as the catalyst; but it is to be understood that this is by way of illustration and not limitation.

The conventional conditions for sulfuric acid alkylation which may be used include an isoparaffin-to-olefin feed ratio of about 3:1 to 8:1 or higher, a recycle ratio of emulsion or hydrocarbon to feed hydrocarbons (the latter including the external isobutane recycle) of about 10:1 to 200:1 or more, an acid concentration in the reaction zone of about 85 to 96%, that is, about 89-96% for $C_4$ and about 85-92% for $C_5$, with make-up acid of about 94-100% strength, a temperature of about 20-100° F. and preferably about 35-60° F., and sufficient pressure to maintain the hydrocarbon reactants in the liquid phase. In addition, the conventional acid-to-hydrocarbon ratio of around 1:1 by volume and the conventional contact time of about 20-60 minutes may be used; but, as pointed out above, the present invention enables higher acid-to-hydrocarbon ratios up to 2:1 and much shorter contact times of down to as little as 1-5 minutes to be employed with advantageous results. Likewise, the high isoparaffin concentration of around 60-70% by volume in the hydrocarbon phase of the reacted mix may be used, although the present invention enables much lower isoparaffin concentrations of the order of about 40-50% to be employed with the greatly improved economies and increased capacity specified above.

The invention is more particularly illustrated in the attached drawing which discloses preferred embodiments thereof, and wherein.

Figure 1:
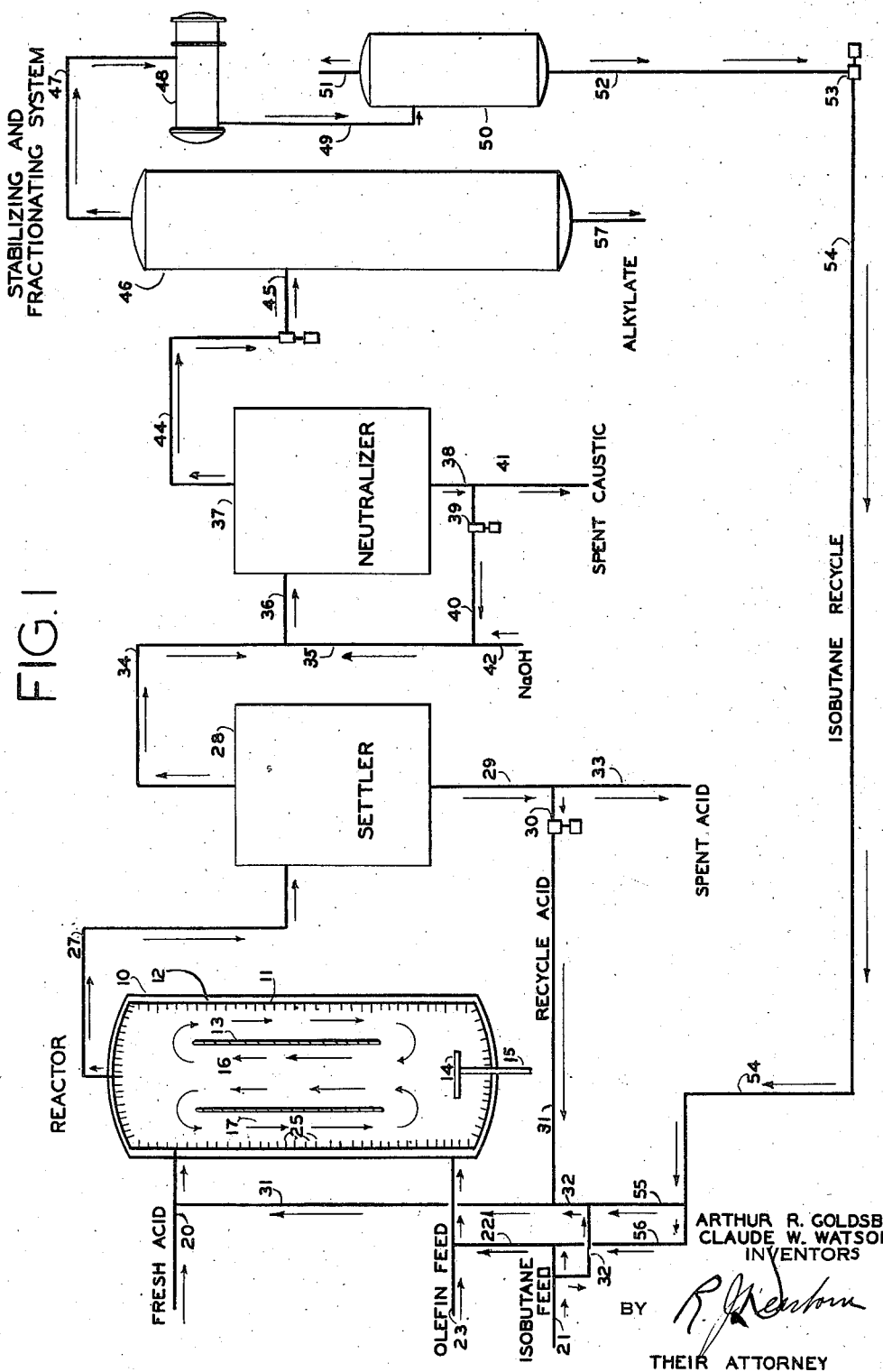
Fig. 1 is a diagrammatic view of one form of reactor of the propeller-mixer type with accompanying accessory equipment.

Referring to Fig. 1, a reactor of the propeller-mixer type is shown having a casing or shell 10 provided with an interior lining 11 forming an annular chamber 12 therebetween. Positioned within the shell is an interior hollow tube 13 which is open-ended and spaced from the wall of the shell. A pump 14 is located adjacent the lower end of tube 13 and is connected by a shaft 15 to a suitable power source (not shown). Operation of the pump causes internal recirculation of the contents of the reactor upwardly through the channel 16 within the hollow tube 13 and thence downwardly through the annular space 17 between tube 13 and liner 11, as indicated by the arrows.

Alkylation catalyst such as sulfuric acid is supplied to the interior recirculating passage of the reactor by line 20, which extends through the annular chamber 12 and liner 11 and opens directly into the space 17. Isobutane or other suitable isoparaffin feed is introduced by line 21. A portion or all of the isobutane may be passed by line 22 to the olefin feed line 23 to thereby provide a mixed hydrocarbon feed in which the isobutane is in substantial molar excess of the olefin. The hydrocarbon feed is introduced under pressure and in liquid phase into the annular chamber 12 of the reactor. Liner 11 is constructed of an acid-resisting porous or perforated material, such as porous alundum or a perforated alloy metal. A large number of olefin charge ports or openings 25 are thus provided surrounding the recirculating passage through which the emulsion is forced by pump 14. The hydrocarbon feed is maintained within the annular chamber 12 at a higher pressure than that maintained within the interior of the reactor proper, whereby the olefin feed passes into the circulating emulsion stream, as indicated in the drawing by the short flow lines extending inwardly from the liner 11, in a multitude of very finely-divided streams which are spaced throughout more than half of the recirculating flow passage. Where a perforated metal liner is employed, the openings may be from about ¼ inch in diameter down to $\frac{1}{32}$ inch or even less. A very satisfactory construction is provided by a metal liner having perforations of about 1/16 to 1/8 inch in diameter with centers spaced about 1 to 6 inches or more apart in all directions about the periphery of the reactor. In a commercial size reactor, this will provide from 100 to 2000 or more openings. Where an alundum liner is employed, of course there will be an extremely large number of ports of capillary size. In any event, it is desirable to have more than 10 to 20 openings which are not only rather evenly distributed around the periphery of the reactor but also extend throughout a substantial portion of the length of the recirculating flow passage.

Where very small openings are used, it may be desirable to filter the liquefied hydrocarbon feed to remove any finely-divided suspended matter from the charge. The rate of feed can be controlled by the differential pressure between the annular chamber 12 and the interior of the reactor. The liquefied hydrocarbon jetting through the openings in fine droplets under the pressure differential employed coupled with the sweeping action of the recirculating emulsion past the openings minimizes plugging thereof; and finely-divided carbon or other particles normally present or formed in the acid is effectively prevented from lodging in the openings. In practice, pressure pulsations applied to annular chamber 12 may be employed from time to time to assist in maintaining the ports free from plugging.

A proportion of the recirculating emulsion is continuously withdrawn by line 27 to settler 28 where the products stratify into a lower acid layer and an upper hydrocarbon layer. The acid is withdrawn by line 29, and all or any portion thereof may be recycled by pump 30 through line 31 to the acid feed line 20. A small proportion of the acid may be continuously or intermittently discharged by line 33, while fresh make-up acid is added by line 20 to maintain the catalyst at desired titratable acidity within the reactor. Preferably, a portion or all of the isobutane feed from line 21 may be passed through branch line 32 and emulsified with the recycle acid in line 31 and fresh make-up acid in line 20 before the latter is introduced into the reactor.

Hydrocarbon is continuously removed from the upper layer in settler 28 by line 34 and mixed with caustic soda solution introduced by line 35, the mixture passing by line 36 into conventional neutralizing and settling equipment indicated generally at 37. Settled caustic soda solution is withdrawn by line 38, and all or any portion thereof recycled by pump 39 through line 40. A portion of the caustic soda solution may be continuously or intermittently discharged by line 41, while fresh make-up NaOH solution is added by line 42.

The neutralized hydrocarbon is then passed by line 44 and pump 45 to a suitable stabilizing and fractionating system indicated by the fractionating tower 46. Excess isobutane is removed overhead by line 47 to condenser 48, and thence by rundown line 49 to accumulator 50, from which uncondensed gas may be released by line 51. Isobutane condensate is withdrawn by line 52 and forced by pump 53 through recycle line 54 and branch lines 55 and 56 to the isobutane feed lines 32 and 22 respectively. Stabilized alkylate is withdrawn by line 57 and fractionated in conventional manner to recover a desired aviation fraction, or desired aviation and motor fuel fractions, from any heavier bottoms. It will be understood that where a refinery fraction, such as a $C_4$ fraction, is employed as the charge, the offgases removed by line 47 in the stabilization of the alkylate will contain some normal butane and probably some propane in addition to isobutane; and these offgases will be fractionated in conventional manner to recover a desired isobutane condensate for recycling through line 54.

Due to the fine subdivision of the olefin streams introduced through the openings or ports 25, and due to the wide spacing of these openings throughout a substantial portion of the reaction zone, each olefin stream or series of droplets is effectively mixed with a relatively large volume of the recirculating emulsion. Consequently, even though the recirculating stream may be traveling at high velocities, the finely-divided olefin particle has substantially reacted by the time that particular increment of the recirculating stream moves past the next olefin introduction point. The disappearance of the olefin as such when finely divided in this manner in the positively-directed recirculating stream occurs almost instantaneously, or within a few seconds at most. While, as pointed out above, the alkylation reaction of the isobutane with the olefin is not necessarily completed, nevertheless the olefin has been converted to a form in which it no longer tends to preferentially react with the acid or other olefin particles or molecules. Rather, the finely-divided olefin particle or droplet, effectively surrounded by a relatively large mass of isobutane in the presence of the acid catalyst, and wherein additional olefin particles are not brought into contact and agglomerated therewith, appears to be preferentially isolated so that desired reaction with the isobutane is assured. Due to these effective reaction conditions, the necessity for extremely high velocities of flow of the recirculating emulsion is avoided and power consumption may be substantially reduced. The capacity of the plant may be maintained or even increased with greatly lowered recirculation rates due to the fact that the contact time for the reaction may be lowered to about 10 minutes or even less. It is to be understood that the reactor may be equipped with suitable cooling or refrigerating coils for controlling the temperature, as is described in greater detail hereinbelow.

Figure 2:
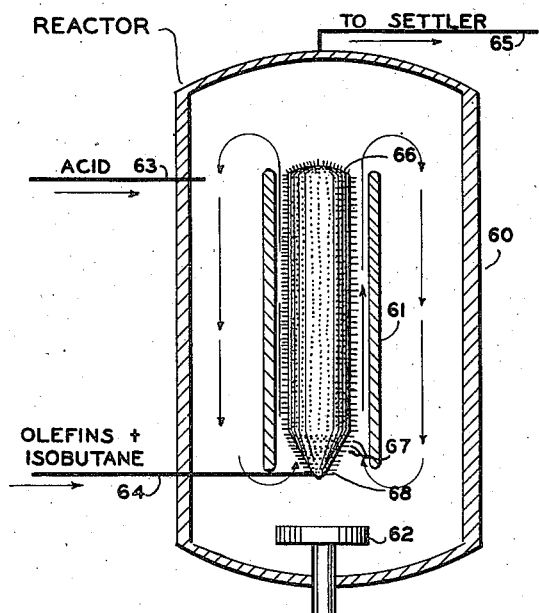
Fig. 2 is a diagrammatic view of a modified propeller-mixer.

Fig. 2 discloses a modified form of reactor of the propeller-mixer type having a shell 60, internal tube 61, pump 62, acid feed line 63, olefin and isobutane feed line 64 and product offtake line 65. In this form, a hollow porous or perforated tube or cylinder 66 is mounted within the tube 61, the said cylinder extending from a point adjacent pump 62 to the upper end of tube 61. This cylinder is provided with a plurality of olefin feed ports or openings 67 extending in this case throughout from 1/4 to 1/2 of the length of the recirculating flow passage. The olefin feed line 64 introduces the liquefied hydrocarbon into the interior of cylinder 66, from which the olefin feed is injected in a multitude of fine streams of droplets at spaced points into the emulsion passing upwardly through tube 61. This is indicated in the drawing by small dots on the exposed face of cylinder 66 to indicate the olefin feed ports or openings 67 which face the observer in this Fig. 2, and by the short flow lines around the sides and ends of cylinder 66 to indicate olefin flow from similar ports at the side of the cylinder which are not exposed to view. The lower end of tube 66 facing the recirculating stream is tapered into a stream-line extremity as indicated at 68, to cut down the resistance to flow. It will be understood that additional cylinders or a series of cylinders in the form of an annular ring may be mounted within the annular channel between tube 61 and casing 60, to be used in conjunction with or in place of the interior cylinder 66. The annular ring of cylinders might be conveniently connected to a suitable header or headers through which the olefin feed is supplied by line 64. It is to be understood that various shapes and configurations of tubes or olefin feed chambers can be employed, so long as the olefin is introduced in finely-divided form at a large number of points spaced throughout a substantial extent of the recirculating flow passage.

Figure 3:
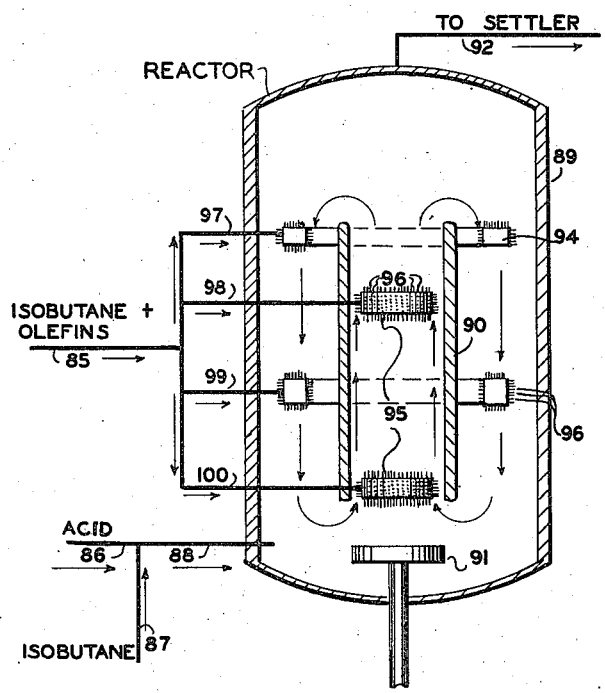
Fig. 3 is a diagrammatic view of still another modification of the propeller-mixer type.
Figure 4:
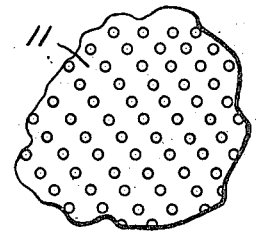
Fig. 4 is an enlarged partial elevational view of the perforated liner 11 of Fig. 1.

Fig. 3 discloses a further modification of a reactor of the propeller-mixer type having an outer casing 89, an inner hollow tube 90, a pump 91, and an offtake 92 leading to a suitable settler. Positioned within the annular channel between casing 89 and tube 90 are a plurality of spaced annular rings 94 which are hollow and serve as supply chambers for alkylating agent. Also positioned within the hollow tube 90 are a plurality of hollow members or chambers 95, also serving as alkylating agent receiving and introducing means. Each of the members 94 and 95 is provided with a porous or perforate wall or walls forming ports or openings 96 for the introduction of the alkylating agent into the recirculating emulsion stream, as indicated in Fig. 3 by the dots and flow lines similar to the illustration for cylinder 66 of Fig. 2. Acid from line 86 emulsified with isobutane from line 87 is introduced by line 88 into the reactor. The charge of olefin, or mixture of isoparaffin and olefin, from line 85 is supplied to the respective members 94 and 95 through branch lines 97, 98, 99 and 100.

While two annular rings 94 and two hollow disc-like members 95 are shown, it will be understood that the number and shape thereof may be varied. Preferably, these supply members are spaced at roughly equal distances throughout the length of the recirculating flow passage, whereby the alkylating agent is introduced in finely-divided form at a large number of spaced points extending throughout a substantial portion of the reaction zone. Each individual member is provided with only a sufficient number of openings of small size such that the individual streams of droplets issuing from these openings are surrounded by a relatively large mass of emulsion stream, whereby agglomeration of alkylating agent from different openings of the same member is avoided and local accumulation of alkylating agent is prevented. The spacing of the respective elements 94 and 95 is such that alkylating agent introduced from one element has substantially reacted by the time the recirculating emulsion stream passes from that element to the next in series. If desired, the elements 95 may be in the form of rings rather than discs or flat cylinders. Moreover, the openings in each of the members may be solely on the side facing toward or away from the direction of flow of the emulsion stream, or may be solely on the edges so as to be more effectively swept by the emulsion moving at right angles past these openings, or any combination of the above may be employed.

The mixed olefin or isobutane-olefin feed may be prechilled; and the prechilled supply of the liquid hydrocarbon in the annular chamber 12 of Fig. 1, the perforated cylinder 66 of Fig. 2 or the perforated rings 94 and chambers 95 of Fig. 3, effects a heat exchange with the emulsion passing in contact therewith in the confined recirculating flow path, thereby effecting a positive temperature control immediately in the reaction zone.

While the invention has been described above in connection with the recycle of emulsion, it is to be understood that the invention is also applicable to an alkylation system employing hydrocarbon recycle. In this case, the hydrocarbon recycle is introduced into an alkylation reaction zone containing the alkylation catalyst of considerable extent or length, and the olefin is introduced in finely-divided form through a large number of spaced small openings extending throughout a substantial portion of the said reaction zone. Moreover, it is pointed out that the feature of effecting indirect heat exchange directly in the alkylation reaction zone and immediately adjacent or opposite the point of olefin introduction, can be accomplished in another manner in the propeller-mixer type of reactors of Figs. 1-3. For example, the bundles of chilling tubes to which refrigerating medium is supplied may be mounted within the reactor immediately adjacent or along the spaced points of olefin introduction.

While the invention has been described as applied specifically to the propeller type of reactor, it is to be understood that the invention is applicable to any type of alkylation reactor having mechanically-maintained agitation, and wherein the alkylating agent is distributed in small droplets throughout a substantial portion of the agitated mixture. For example, the invention can be practiced with a so-called "Votator" mixer, a rotary mixer, a turbo type reactor, or any other type designed to give substantial uniformity throughout the agitated reaction mixture.

While the invention has been described above as particularly applied to the alkylation of an isoparaffin with an alkylating agent, it is to be understood that the invention is applicable to the alkylation of any organic compound having a readily replaceable hydrogen atom with a suitable alkylating agent. For example, the method and apparatus described herein can be employed for the alkylation of a normal paraffin with an olefin or other alkylating agent, employing a catalyst effective for this normal paraffin alkylation, such as $HF$—$BF_3$, aluminum chloride with hydrogen chloride, and the like. Likewise, the invention is applicable to the alkylation of aromatics and hydroxyaromatics, such as benzene, toluene, xylene, phenol, cresol, etc., with an alkylating agent such as an olefin, an alcohol, an alkyl halide, etc. By way of specific examples, there is mentioned the alkylation of benzene with ethylene to produce ethyl benzene, an intermediate in the manufacture of styrene, the alkylation of chlorinated kerosene with benzene to produce so-called "keryl benzene" for detergents and wetting agents; and the preparation of alkylated phenols. The conditions for these various reactions are known; and the conventional conditions can be utilized in conjunction with the principles of the present invention involving the introduction of the alkylating agent in small portions or droplets at widely distributed points throughout the mechanically-agitated reaction mixture. The expression "organic compound having a replaceable hydrogen atom" is used for convenience throughout the description and claims to designate the various materials described above which can be alkylated with the mentioned alkylating agents in the presence of suitable alkylation catalysts as described.

While the invention has been illustrated and described above in connection with a single reactor system or unit, it is to be understood that the invention is applicable to a multi-stage system employing concurrent or countercurrent flow of hydrocarbons and catalyst through the system, as well as such a multi-stage system employing split feed of olefin by the multitudinous point injection method in each of a plurality of stages of the system. In fact, the present invention affords advantages in such a multi-stage system having split feed of olefin not now attainable on a practical commercial scale by conventional equipment, such as the propeller type mixer. For example, in the present multi-stage system having "Stratco" mixers for each stage and using split olefin feed between the stages, the full theoretical advantages cannot now be practically realized because of structural and operating limitations. Thus, it is customary to employ a full-size mixer operating at about the upper practical limit of recirculating capacity to obtain the desired contact ratio and contact time in the first stage. Consequently, the second and succeeding stages have to handle and recirculate the alkylate produced in the previous stage or stages in addition to the isoparaffin and olefin undergoing reaction therein. This means that the succeeding stages have to operate at reduced capacity or lower olefin feed rate to maintain these optimum conditions of contact ratio and contact time, as otherwise the succeeding mixers would have to be of impractically large size and operate with objectionably high power consumption. By employing the principles of the present invention, enabling the internal recycle rate and the contact time to be cut down for a given size unit with at least equivalent or better results, a multi-stage system with individual reactors of practical size and greatly decreased power consumption can be operated with all stages under optimum conditions and at full capacity, thereby realizing the full theoretical advantages of split olefin feed between the separate stages as well as the new advantages and results of the multitudinous point olefin introduction in each stage as set forth above.

Obviously many modifications and variations of the invention, as hereinbefore set forth, may be made without departing from the spirit and scope thereof, and therefore only such limitations should be imposed as are indicated in the appended claims.

We claim:

1. A process for the synthesis of hydrocarbons which comprises passing a stream of alkylatable hydrocarbons through a reaction chamber having permeable walls, passing a stream of corrosive mobile alkylation catalyst through said reaction chamber in intimate contact with said hydrocarbons, introducing into said reaction chamber through said permeable walls a non-corrosive hydrocarbon fluid comprising olefins, maintaining alkylation conditions within said chamber to effect reaction of said alkylatable hydrocarbons with said olefins, and introducing said olefins at such rate so as to avoid undesirably high concentrations of olefins in the reaction mixture and so as to interpose a relatively catalyst-free barrier between the catalyst-hydrocarbon mixture and the walls of the reaction chamber.

2. A process as defined in claim 1 in which said catalyst comprises aluminum chloride, said alkylatable hydrocarbon is isobutane, said olefin is ethylene, and said fluid comprising olefins serves to remove heat of reaction.

3. In the alkylation of a low boiling isoparaffin with an olefin in liquid phase in the presence of a liquid alkylation catalyst under alkylation conditions, wherein a substantial body of the reaction mix having an isoparaffin concentration in the hydrocarbon phase in excess of 40% by volume is mechanically recirculated in a confined flow path within a reaction zone to provide an internal isoparaffin recycle to hydrocarbon feed ratio in excess of 10:1, while the recirculating reaction mix is chilled to remove exothermic heat of reaction, and a small stream of the reaction mix is withdrawn from the recirculating mix as fresh hydrocarbon feed and catalysts are added thereto; the improvement which comprises continuously introducing hydrocarbon feed including all the olefin, unmixed with catalyst, into the recirculating reaction mix in a very large number, in excess of 50, of simultaneously added tiny liquid feed droplets, each of less than ¼ inch in diameter and down to about capillary size, said feed droplets being spaced on initial introduction both lengthwise and laterally throughout a major portion of the confined flow path within the reaction zone, and with the droplets spaced sufficiently from each other to avoid local build-up of unreacted olefin concentration in the reaction mix at any point thereof so as to provide an effective isoparaffin-olefin contact ratio at the immediate point of olefin entry substantially in excess of 1500:1.

ARTHUR R. GOLDSBY.
CLAUDE W. WATSON.

REFERENCES CITED

The following references are of record in the file of this patent:

UNITED STATES PATENTS

| Number | Name | Date |
|---|---|---|
| 1,333,328 | Martin | Mar. 9, 1920 |
| 1,941,111 | Schlecht | Dec. 26, 1933 |
| 1,971,852 | Goebels | Aug. 28, 1934 |
| 2,002,394 | Frey | May 21, 1935 |
| 2,024,680 | Curtis | Dec. 17, 1935 |
| 2,131,191 | Roetheli | Sept. 27, 1938 |
| 2,222,012 | Amos | Nov. 19, 1940 |
| 2,238,802 | Altshuler | Apr. 15, 1941 |
| 2,246,703 | Thiele | June 24, 1941 |
| 2,308,786 | Smith | Jan. 19, 1943 |
| 2,311,144 | Wickham | Feb. 16, 1943 |
| 2,312,719 | Kuhl | Mar. 2, 1943 |
| 2,317,901 | Frey | Apr. 27, 1943 |
| 2,322,482 | Stahly | June 27, 1943 |
| 2,335,704 | Smith | Nov. 30, 1943 |